(12) United States Patent
Koo et al.

(10) Patent No.: US 10,656,846 B2
(45) Date of Patent: May 19, 2020

(54) OPERATING METHOD OF MEMORY SYSTEM

(71) Applicant: SK hynix Inc., Gyeonggi-do (KR)

(72) Inventors: Duck Hoi Koo, Gyeonggi-do (KR);
Soong Sun Shin, Gyeonggi-do (KR);
Yong Tae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 246 days.

(21) Appl. No.: 15/785,586

(22) Filed: Oct. 17, 2017

(65) Prior Publication Data
US 2018/0239548 A1 Aug. 23, 2018

(30) Foreign Application Priority Data
Feb. 23, 2017 (KR) .................. 10-2017-0023891

(51) Int. Cl.
G06F 11/30 (2006.01)
G06F 3/06 (2006.01)
G06F 11/16 (2006.01)
G06F 11/14 (2006.01)
G06F 11/34 (2006.01)

(52) U.S. Cl.
CPC ............ G06F 3/0619 (2013.01); G06F 3/065 (2013.01); G06F 3/0607 (2013.01); G06F 3/0653 (2013.01); G06F 3/0688 (2013.01); G06F 11/1471 (2013.01); G06F 11/1658 (2013.01); G06F 11/1662 (2013.01); G06F 11/3034 (2013.01); G06F 11/3409 (2013.01); G06F 11/1417 (2013.01); G06F 2201/805 (2013.01); G06F 2201/82 (2013.01)

(58) Field of Classification Search
CPC ............... G06F 3/0619; G06F 11/1662; G06F 11/1471; G06F 11/3034; G06F 11/3409; G06F 3/065; G06F 3/0688; G06F 11/1658; G06F 3/0653; G06F 3/0607; G06F 11/1417; G06F 2201/82; G06F 2201/805
See application file for complete search history.

(56) References Cited

U.S. PATENT DOCUMENTS

| 5,200,959 A * | 4/1993 | Gross ................... G11C 29/765 714/6.13 |
| 5,732,240 A * | 3/1998 | Caccavale ............... G06F 11/32 710/56 |
| 7,464,246 B2 * | 12/2008 | Gill ..................... G06F 12/0862 711/136 |
| 2003/0163756 A1 * | 8/2003 | George .............. G11B 20/1883 714/6.13 |
| 2012/0210041 A1 * | 8/2012 | Flynn ...................... G06F 1/183 711/3 |

(Continued)

FOREIGN PATENT DOCUMENTS

KR 1020130019891 2/2013

*Primary Examiner* — Nadeem Iqbal
(74) *Attorney, Agent, or Firm* — IP & T Group LLP

(57) ABSTRACT

A method for operating a memory system includes updating, after accessing ail of one or more first memory regions included in a first list for a purpose of data storage, map data for the first memory regions; determining a list size based on a workload of the memory system, and generating a second list including one or more second memory regions depending on the list size; and accessing, after the updating of the map data, the second memory regions for a purpose of data storage.

19 Claims, 9 Drawing Sheets

(56) References Cited

U.S. PATENT DOCUMENTS

2014/0258595 A1\* 9/2014 Venkatesha ........... G06F 9/5016
711/103
2016/0026406 A1\* 1/2016 Hahn .................... G06F 3/0631
711/103

\* cited by examiner

| Frequency | Sequential | Random |
|---|---|---|
| List scale | Ns | Nr |

( 1 ≤ Ns ≤ Nr ≤ Nsp )

| Frequency | Sequential | | Random | |
|---|---|---|---|---|
| | Strong | Weak | Weak | Strong |
| List scale | Ns1 | Ns2 | Nr1 | Nr2 |

( 1 ≤ Ns1 ≤ Ns2 ≤ Nr1 ≤ Nr2 ≤ Nsp )

OPERATING METHOD OF MEMORY SYSTEM

CROSS-REFERENCES TO RELATED APPLICATION

The present application claims priority under 35 U.S.C. § 119(a) to Korean application number 10-2017-0023891, filed on Feb. 23, 2017, in the Korean Intellectual Property Office, which is incorporated herein by reference in its entirety.

BACKGROUND

1. Technical Field

Various embodiments generally relate to a semiconductor memory system, and, more particularly, to a memory system memory system including a nonvolatile memory device, and an operating method thereof.

2. Related Art

Semiconductor technology memory systems, also referred to simply as memory systems, may store data provided by an external device in response to a write request. Memory systems may also provide stored data to an external device in response to a read request. The external device may be any electronic device. The externa device may be a host electronic device to which the memory system is attached to or is embedded therein. Examples of external devices that use memory systems for storing data include computers such as desk top computers, lap top computers and tablets, digital cameras, cellular phones, smart phones, electronic organizers, electronic book readers, and the like. Memory systems may be embedded in an external device during manufacturing of the external devices or may be fabricated separately and then connected afterwards to an external device.

SUMMARY

The present invention provides an improved operating method for a memory system employing one or more memory devices. The operating method may ensure higher data reliability than existing devices. Furthermore, the utilization efficiency of one or more memory devices may be improved.

In an embodiment, a method for operating a memory system may include: updating, after accessing all of one or more first memory regions included in a first list for a purpose of data storage, map data, for the first memory regions; determining a list size based n a workload of the memory system, and generating a second list including one or more second memory regions depending on the list size; and accessing, after the updating of the map data, the second memory regions for a purpose of data storage.

In an embodiment, a method for operating a memory system may include: determining a list size based on a workload of the memory system, and generating a list including one or more memory regions depending on the list size; logging the list in a log region before accessing the memory regions for a purpose of data storage; and updating, after accessing all of the memory regions for a purpose of data storage, map data for the memory regions.

In an embodiment, a method for operating a memory system may include: logging, before accessing one or more first memory regions included in a first list for a purpose of data storage, the first list in a log region; updating, after accessing all of the first memory regions for a purpose of data storage, map data for the first memory regions; and logging, before accessing one or more second memory regions included in a second list for a purpose of data storage, the second list in the log region, wherein the logging of the second list succeeds the updating of the map data.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Figure 1:
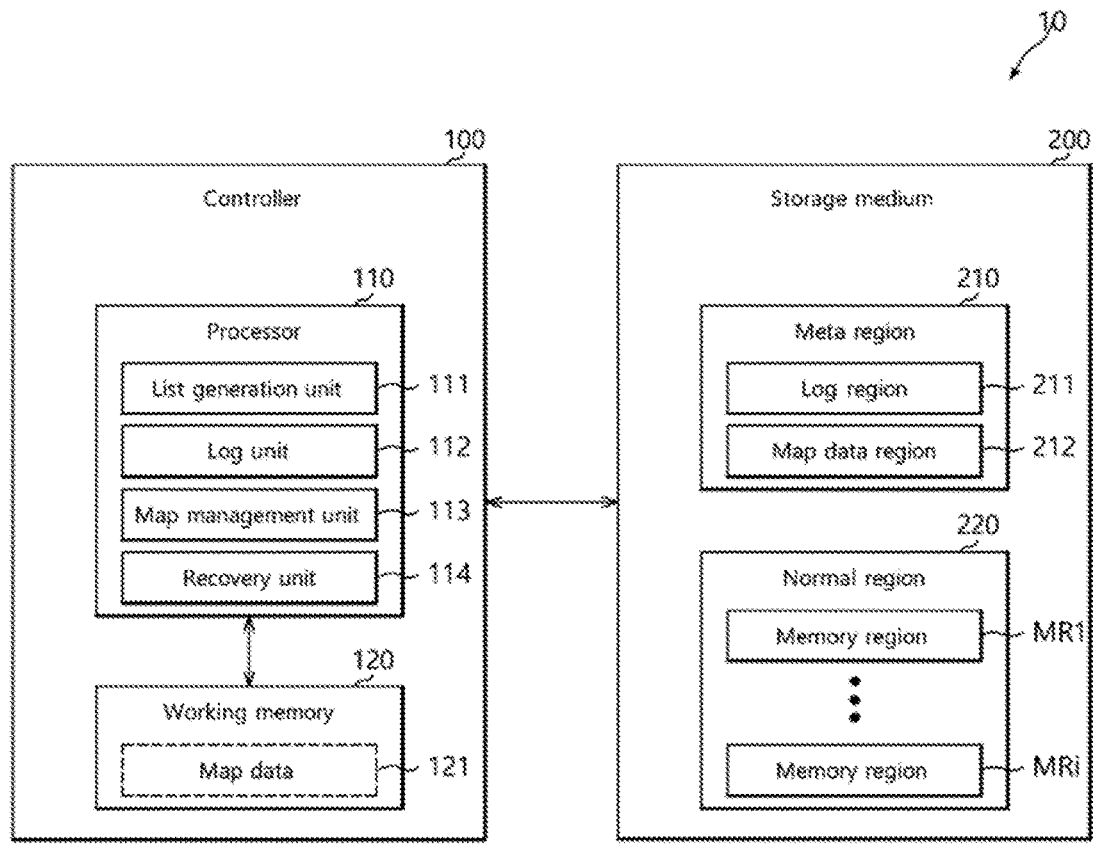
FIG. 1 is a block diagram illustrating a memory system in accordance with an embodiment of the present invention.

Hereinafter, various exemplary embodiments of the present invention including a memory system and an operating method thereof are described with reference to the accompanying drawings. The present invention may, however, be embodied in different forms and should not be construed as being limited to the embodiments set forth herein. Rather, these embodiments are provided to describe the present invention in sufficient detail to allow a person skilled in the art to which the present invention pertains to practice the technical concepts of the present invention without undue experimentation.

It is to be understood that embodiments of the present invention are not limited to the particulars shown in the drawings, that the drawings are not necessarily drawn to size, and, in some instances, various proportions of the drawings may have been exaggerated for more clearly depicting certain features or elements of the invention. Furthermore, while particular terminology is used, it is to be appreciated that the terminology used is for describing particular embodiments only and is not intended to limit the scope of the present invention.

It will be further understood that when a feature or an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising" "includes," and "including" when used in this specification, specify the presence of the stated elements and do not preclude the presence or addition of one or more other non-stated elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a memory system 10 in accordance with an embodiment of the present invention.

The memory system 10 may be employed as a data storage device for storing data for any suitable electronic device. The memory system 10 may be configured to store data provided from an external device which is operatively coupled with the memory system 10 in response to a write request received from the external device. Also, the memory system 10 may be configured to provide stored data to the external device, in response to a read request received from the external device.

For example, the memory system 10 may be operatively coupled to or configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-State Drive (SSD) and the like.

The memory system 10 may include a controller 100 and a storage medium 200. The controller 100 may include a processor 110 and a working memory 120. The controller 100 may control the operation of the memory system 10, such as for example, foreground and and/or background operations of the memory system. The foreground and background operations may also be referred to herein as general operations. Foreground operations may include, for example, read and write operations, while background operations may include refresh, wear leveling, map update, garbage collection operations. In an embodiment, the controller 100 may control all of the general operations of the memory system 10, however, the present invention is not limited in this way.

The processor 110 may control one or more operations of the controller 100. For example, the processor 110 may control the storing of data in memory regions MR1 to MRi of a normal region 220 included in the storage medium 200 in response to a write request received from an external device, and may read out data stored in the memory regions MR1 to MRi and output the read-out data to the external device in response to a read request received from the external device.

According to an embodiment, the processor 110 may first access all of one or more first memory regions for storing data. The first memory regions may be included in a first memory region list. The first memory list may include one or more first memory regions that are suitable for storing data for a first purpose. Then, after accessing all of the one or more first memory regions and upon completing the data storing in all of the one or more first memory regions, the processor 110 may update the map data for the first memory regions and determine a list size based on the workload of the memory system 10. The processor 110 may then generate a second memory region list including one or more second memory regions that are suitable for storing data for a first purpose according to the newly determined list size. After the update of the map data for the first memory regions, the processor 110 may access the second memory regions for storing data.

According to an embodiment, the processor 110 may determine a list size based on the workload of the memory system 10, generate a memory region list including one or more memory regions according to the list size, log the memory region list before accessing the memory regions included in the memory region list for a purpose of data storage, and update map data for the memory regions after accessing all of the memory regions for a purpose of data storage.

According to an embodiment, the processor 110 may log a first memory region list before accessing one or more first memory regions included in the first memory region list for a purpose of data storage, may update the map data for the first memory regions after accessing all of the first memory regions for a purpose of data storage, and log a second memory region list before accessing one or more second memory regions included in the second memory region list for a purpose of data storage. The logging of the second memory region list may follow the update of the map data for the first memory regions. The size of the first and second memory region lists may be based on the workload of the memory system 10, and may be different as the workload may change. Hence, the size of the first memory region list may be based on a first workload of the memory system 10 calculated before logging the first memory region list, whereas the size of the second memory region list may be based on a second workload of the memory system 10 calculated after the update of the map data for the first memory regions and before logging the second memory region list.

The processor 110 may include a list generation unit 111, a log unit 112, a map management unit 113, and a recovery unit 114.

The list generation unit 111 may generate a memory region list. The memory region list may include one or more memory regions which are to be sequentially accessed for a purpose of data storage. The list generation unit 111 may generate a succeeding memory region list in advance before all of the memory regions included in a previous memory region list are accessed. Alternatively, the list generation unit 111 may generate a succeeding memory region list after all of the memory regions included in a previous memory region list are accessed. The list generation unit 111 may select memory regions to be included in a memory region list according to a wear leveling policy.

In particular, the list generation unit 111 may determine the number of memory regions (i.e., a list size) to be included in a memory region list based on the workload of the memory system 10. Since performance of the memory system 10 and a recovery time after an abnormal power-off have a trade-off relationship with respect: to a list size, the list generation unit 111 according to the present embodiment may determine a list size in consideration of these factors. Detailed descriptions therefor will be made with reference to FIGS. 6 to 8.

The log unit 112 may log a succeeding memory region list in a log region 211 when all of memory regions included in a previous memory region list are accessed and before memory regions included in the succeeding memory region list begin to be accessed. In detail, the log unit 112 may log the succeeding memory region list in the log region 211 only after map data 121 for the previous memory region list are updated by the map management unit 113.

Also, each time a memory region is completely accessed, that is, each time a memory region is closed, the log unit 112 may log information on the closed memory region in the log region 211. Logs of the log region 211 may be used in determining a recovery range when a recovery operation is performed after an abnormal power-off. The detailed operation of the log unit 112 will be described with reference to FIG. 2.

The map management unit 113 may manage the map data 121 in which logical addresses and physical addresses are mapped. A logical address may be used for the external device to access the storage medium 200, and a physical address may be an actual address of the storage medium 200. Among the map data 121, the map management unit 113 may map a logical address provided along with data from the external device and a physical address of the normal region 220 into which the provided data is written. When the external device requests a read data of a logical address provided along with the read request, the map management unit 113 may identify a physical address mapped to the provided logical address among the map data 121, and read out data of the identified physical address and provide the read-out data to the external device.

The map management unit 113 may generate map data 121 corresponding to data each time the data is stored in the normal region 220. That is to say, the map data 121 may be updated as data are being stored in the normal region 220. Conversely, a map data region 212 of the storage medium 200 may be managed as out of date. Accordingly, the map management unit 113 may update the out-of-date map data stored in the map data region 212 based on the up-to-date map data 121. In detail, when all memory regions included in a certain memory region list are accessed, the map management unit 113 may reflect the up-to-date map data 121 for corresponding memory regions into the map data region 212.

Meanwhile, even before map data 121 are reflected into the map data region 212, the map data 121 may be stored in the normal region 220 together with corresponding data. As will be described later, when map data 121 are not reflected yet into the map data region 212 and thus are lost due to an abnormal power-off, the map data 121 may be recovered based on the map data 121 stored in the normal region 220.

The recovery unit 114 may perform a recovery operation for an abnormal power-off. The recovery unit 114 may determine a recovery range by tracing logs stored in the log region 211. The recovery operation of the recovery unit 114 may include a map data recovery work for a loss range of map data and a data moving work for a damage range of a memory region. Detailed descriptions for the recovery operation of the recovery unit 114 will be made with reference to FIGS. 5 and 9.

The working memory 120 may retain the map data 121 managed by the map management unit 113. The up-to-date map data 121 may be copied in the map data region 212 at a predetermined time as described above, that is, when all memory blocks included in a corresponding memory region list have been accessed.

The working memory 120 may be a volatile memory device such as a static random access memory (SRAM) and a dynamic random access memory (DRAM). A volatile memory device may lose data stored therein when a power-off occurs.

However, according to an embodiment, the working memory 120 may be a nonvolatile memory device such as a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

Under the control of the controller 100, the storage medium 200 may store data transmitted from the controller 100 and may read out stored data and transmit read-out data to the controller 100. The storage medium 200 may include a meta region 210 and the normal region 220.

The meta region 210 may store metadata including various operation data necessary for the operation of the memory system 10. The meta region 210 may include the log region 211 where logs are stored by the log unit 112 and the map data region 212 where map data are stored by the map management unit 113.

The normal region 220 may store normal data transmitted from the external device other than metadata which are stored in the meta region 210. The normal region 220 may include the plurality of memory regions MR1 to MRi, and a memory region list may be generated for such memory regions MR1 to MRi of the normal region 220.

Meanwhile, the storage medium 200 may include one or more nonvolatile memory devices. Each of the memory regions MR1 to MRi included in the normal region 220 may exist over the one or more nonvolatile memory devices. For example, each memory region may include memory blocks which have the same address in the respective nonvolatile memory devices. A memory block may be a unit of an erase operation to a nonvolatile memory device. A memory block may comprise a plurality of pages each page comprising of memory cells coupled to the same word line.

Figure 2:
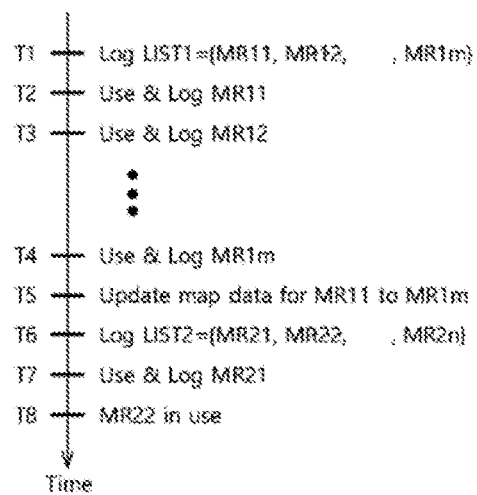
FIG. 2 is a diagram illustrating a method for operating the memory system shown in FIG. 1.
Figure 2:
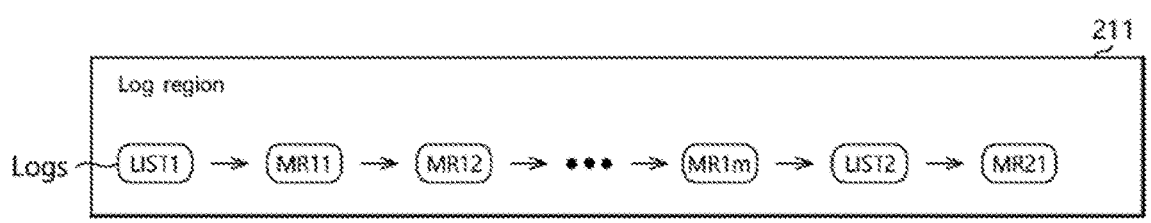

FIG. 2 is a diagram illustrating a method for operating the memory system 10 of FIG. 1. FIG. 2 illustrates a log process and a map data update process according to access to a first memory region list LIST1 and a second memory region list LIST2. In FIG. 2, processes of generating the first memory region list LIST1 and the second memory region list LIST2 are omitted.

First, at a time T1, the log unit 112 may log the first memory region list LIST1 in the log region 211 of the meta region 210 of the storage medium 200 The first memory region list LIST1 may include memory regions MR11 to MR1m which are to be accessed sequentially. The size of the first memory region list LIST1, that is, the number of the memory regions MR11 to MR1m in the list, may be determined according to a method to be described later.

At a time T2, the memory region MR11 may be accessed according to an access sequence arranged in the first memory region list LIST1. When the memory region MR11 is closed, the log unit 112 may log information on the memory region MR11 in the log region 211. The information on the memory region MR11 may be an address of the memory region MR11. A memory region is closed when it is fully written with data.

From a time T3 to a time T4, the memory regions MR12 to MR1m may be accessed sequentially according to the access sequence arranged in the first memory region list LIST1. Each time a memory region among the memory regions MR12 to MR1m is closed, the log unit 112 may log information on the respective closed memory region in the log region 211.

At a time T5, when all of the memory regions MR11 to MR1m have been accessed, the map management unit 113 may update out-of-date map data stored in the map data region 212 based on up-to-date map data 121 for the memory regions MR11 to MR1m stored in the working memory 120.

At a time T6, the log unit 112 may log the second memory region list. LIST2 in the log region 211. The second memory region list LIST2 may include memory regions MR21 to MR2n to be accessed sequentially. The list size of the second memory region list LIST2, that is, the number of the memory regions MR21 to MR2n, may be determined according to a method to be described later.

At a time T7, the memory region MR21 may be accessed according to an access sequence arranged in the second memory region list LIST2. When the memory region MR21 is closed, the log unit 112 may log information on the memory region MR21 in the log region 211. Likewise, each of the memory regions in the second memory region list LIST2 is accessed sequentially and when each memory region is closed the log unit logs information on the respective memory region that is closed.

For example, at a time T8, the memory region MR22 may be in access according to the access sequence arranged in the second memory region list LIST2.

As described above with reference to FIG. 2, the updating of the map data for the first memory region list LIST1 at the time T5 precedes the logging of the second memory region list LIST2 at the time T6. Also, as explained earlier, when all memory blocks have been accessed then the updated map data which are stored in the working memory 120 are copied into the map data region 212. Accordingly, the logging of a succeeding memory region list in the log region 211, may confirm that an update of map data for a previous memory region list has been completed.

Figure 3:
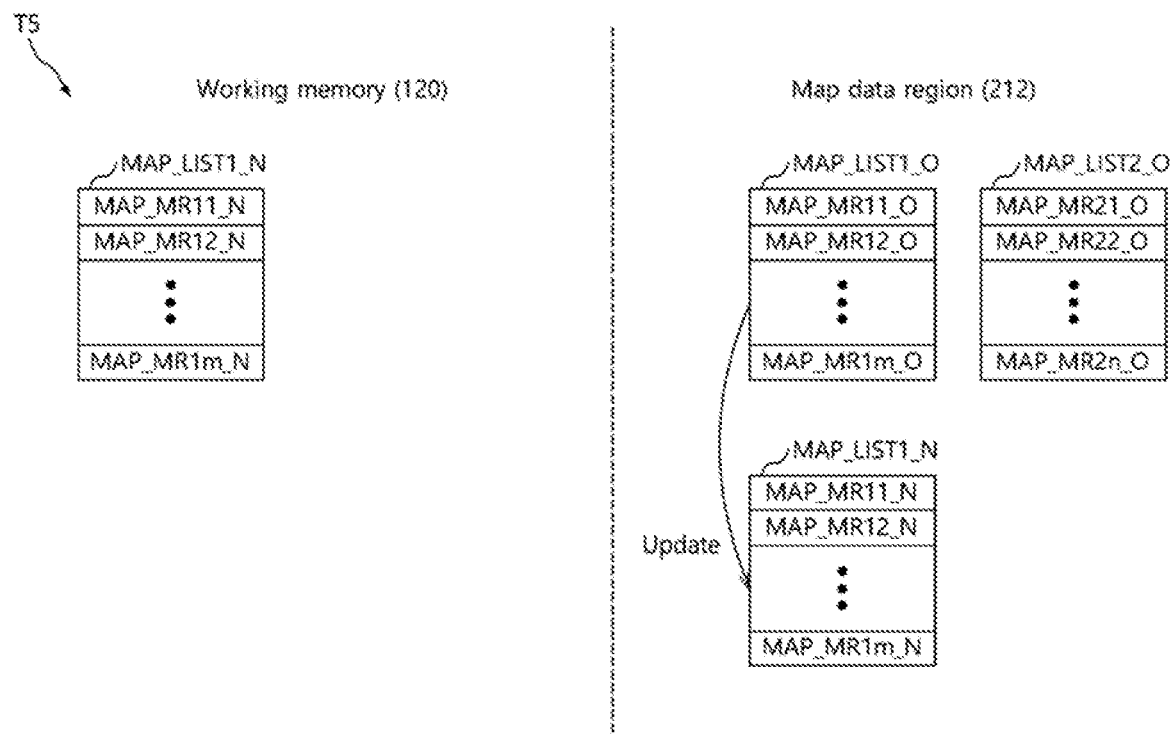
FIG. 3 is a diagram illustrating states of map data.
Figure 3:
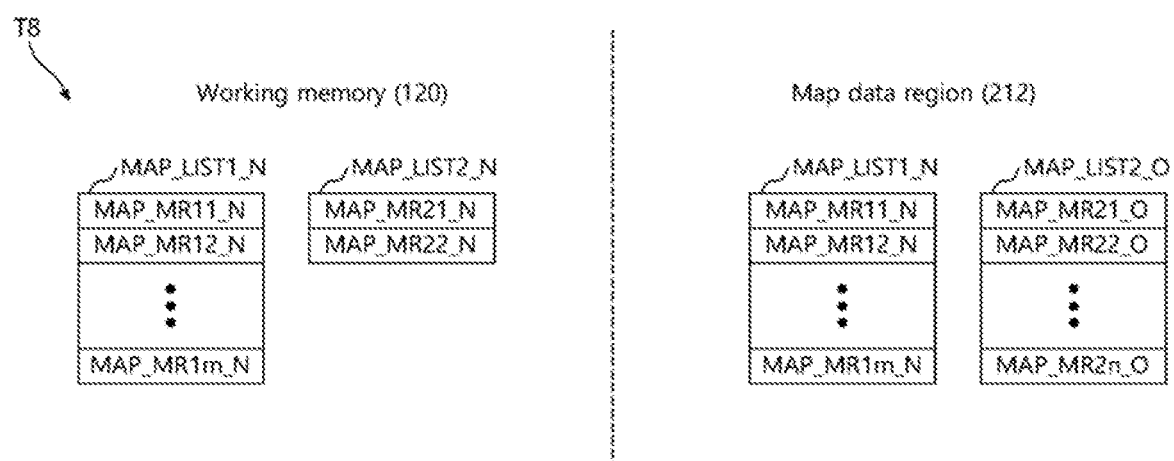

FIG. 3 is a diagram illustrating states of map data at the times T5 and T8 of FIG. 2.

Referring to FIG. 3, at the time T5 when all of the memory regions MR11 to MR1m included in the first memory region list LIST1 have been accessed, map data MAP_LIST1_N for the first memory region list LIST1 stored in the working memory 120 may be up to date because they were generated while the memory regions MR11 to MR1m were accessed. The up-to-date map data MAP_LIST1_N may include map data MAP_MR11_N to MAP_MR1m_N for the memory regions MR11 to MR1m. Conversely, out-of-date map data MAP_LIST1_O for the first memory region list LIST1. may include map information before the first memory region list LIST1 is accessed. Therefore, the out-of-date map data MAP_LIST1_O stored in the map data region 212 may be updated based on the up-to-date map data MAP_LIST1_N stored in the working memory 120. For example, as explained above, the updated map data stored in the working memory 120 may be copied into the map data region 212 when all the memory regions of the first memory list have been accessed and before the new memory region list is logged.

Meanwhile, at the time T5, the map data region 212 may retain also map data MAP_LIST2_O for the second memory region list LIST2. The map data MAP_LIST2_O may include map information before the second memory region list LIST2 is accessed. Because it is before the second memory region list LIST2 is accessed, the map data MAP_LIST2_O may still be up to date. However, in the case where all of the memory regions MR21 to MR2n included in the second memory region list LIST2 are erased, the map data MAP_LIST2_O may be out of date.

At the time T8 when the memory region MR22 included in the second memory region list LIST2 is being accessed, the working memory 120 may retain up-to-date map data MAP_LIST2_N for the second memory region list. LIST2. The up-to-date map data MAP_LIST2_N may include map data MAP_MR21_N and MAP_MR22_N for the memory regions MR21 and MR22. However, the map data MAP_MR21_O and MAP_MR22_O stored in the map data region 212 may be still out of date because it is before the up-to-date map data MAP_LIST2_N are copied into the map data region.

Figure 4:
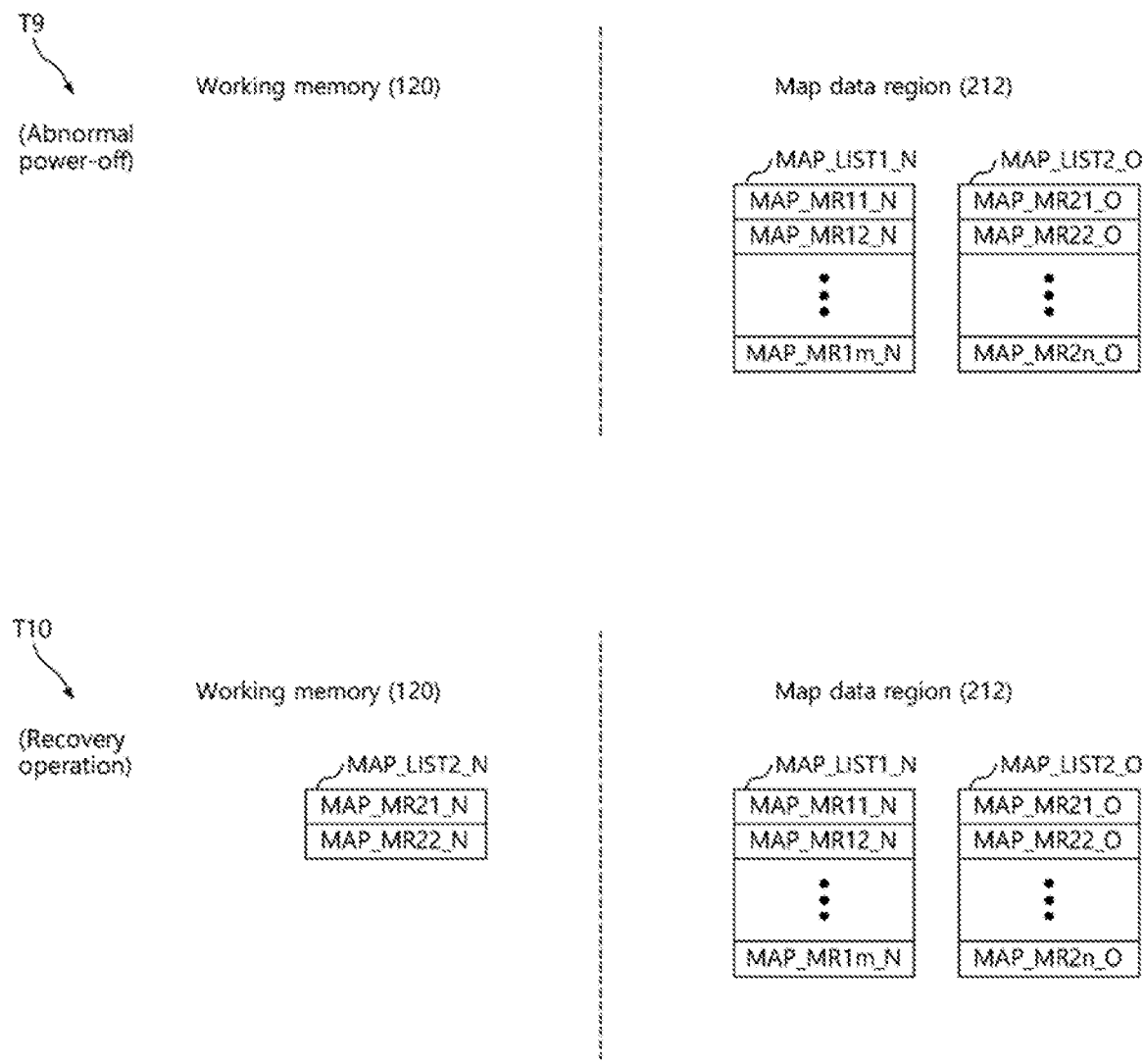
FIG. 4 is a diagram illustrating a map data recovery work when an abnormal power-off occurs.

FIG. 4 is a diagram illustrating a map data recovery work when an abnormal power-off occurs after the time T8 of FIGS. 2 and 1

Referring to FIG. 4, at a time T9 after the time T8, if an abnormal power-off occurs, all the map data stored in the working memory 120 may be lost when the working memory 120 is volatile. However, the map data MAP_LIST1_N and MAP_LIST2_O stored in the map data region 212 are retained.

At a time T10, the recovery unit 114 may recover only the map data MAP_LIST2_N for the second memory region list LIST2. Namely, because the up-to-date map data MAP_LIST2_N for the memory regions MR21 and MR22 of the second memory region list. LIST2 are not reflected yet in the map data region 212 at the time of the abnormal power-off, they should be recovered. However, because the up-to-date map data MAP_LIST1_N for the first memory region list LIST1 had not been reflected (copied, updated) in the map data region 212 at the time of the abnormal power-off, they do not need to be recovered.

As described above, the map data to be recovered for the memory regions MR21 and MR22 may be stored in the memory regions MR21 and MR22 together with corresponding data. The recovery work may be performed by collecting map data stored in a recovery range, that is, the memory regions MR21 and MR22.

It takes longer time to recover the map data of the working memory as an amount of the map data to be recovered becomes larger. Therefore, it is preferable to recover only as many data as required to be recovered. In the present embodiment, the recovery unit 114 may determine a map data recovery range, that is, a map data loss range. In FIG. 4, a map data loss range may be the memory regions MR21 and MR22. As will be described below, a map data toss range may be determined efficiently by tracing the log region 211.

Figure 5:
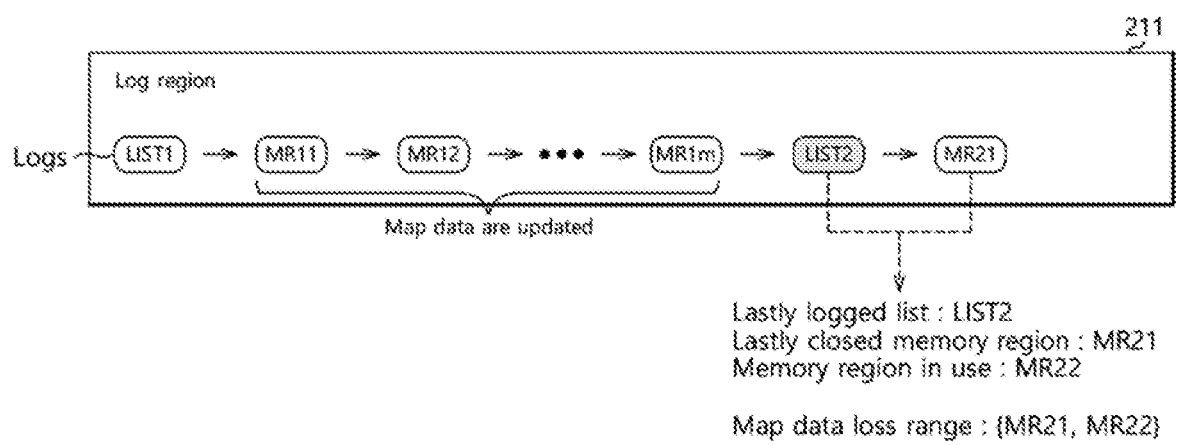
FIG. 5 is a diagram illustrating a method of determining a map data loss range.

FIG. 5 is a diagram illustrating a method of determining a map data loss range by the recovery unit 114.

Referring to FIG. 5, the recovery unit 114 may detect a lastly logged memory region list in the log region 211. If the second memory region list LIST2 is lastly logged in the log region 211, the recovery unit 114 may determine that all of the map data for the memory regions MR11 to MR1*m* included in the first memory region list LIST1, which is supposed as logged before the second memory region list LIST2, are updated into the map data region 212. That is to say, as described above, since update of the map data for the first memory region list LIST1 is performed into the map data region 212 before logging the second memory region list. LIST2, log of the second memory region list LIST2 may represent the completion of update of the map data for the first memory region list LIST1 into the map data region 212.

Further, based on information on the second memory region list LIST2 and the memory region MR21 which are lastly logged, the recovery unit 114 may detect that the lastly logged memory region MR21 is closed just before the abnormal power-off and the memory region MR22, which is the one immediately subsequent to the lastly logged memory region MR21, was being used at the time of the abnormal power-off. Thus, the recovery unit 114 may determine that the map data for the memory regions MR21 and MR22 are not updated into the map data region 212, and determine the memory regions MR21 and MR22 as a map data loss range.

Summarizing these, the recovery unit 114 may detect a lastly logged memory region list and a lastly logged (i.e., a lastly closed) memory region in the log region 211, and determine as a map data loss range a first one to an immediately subsequent one of the lastly closed memory region among the memory regions in the lastly logged memory region list.

Hereunder, the relationship between a map data loss range and a list size of a lastly logged memory region list will be described.

Figure 6A:
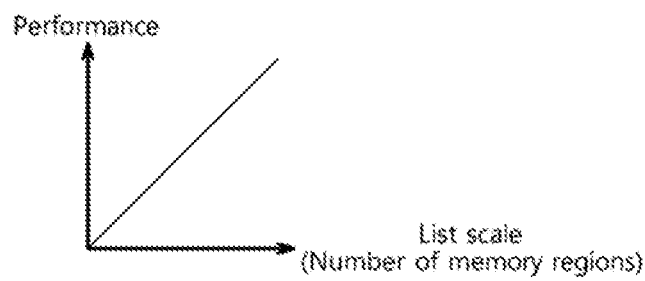
FIG. 6A is a graph illustrating the relationship between a list size and performance of the memory system.
Figure 6B:
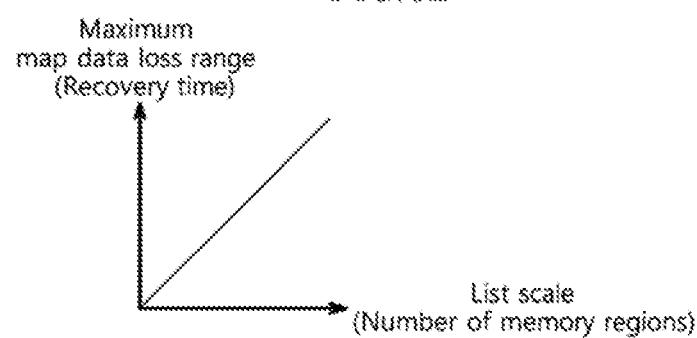
FIG. 6B is a graph illustrating the relationship between a list size and a maximum map data recovery range.

FIG. 6A is a graph illustrating the relationship between a list size and performance of the memory system 10. FIG. 6B is a graph illustrating the relationship between a list size and a maximum map data recovery range.

Referring to FIG. 6A, as a list size of a memory region list becomes larger, performance of the memory system 10 may also improve. This is because, if the number of memory regions included in a memory region list increases, the map data update of the memory system is performed less frequently. In general, frequent map data update is likely to degrade the performance of the memory system 10.

Referring to FIG. 6B, as a list size of a memory region list, which may be a lastly logged one at the time of an abnormal power-off, becomes larger, a maximum map data loss range may also increase. A maximum map data loss range may be all of memory regions included in a lastly logged memory region list. It takes longer recovery time to recover memory regions of a greater map data loss range. In general, a longer recovery process during booting of the memory system 10 is not preferable.

Summarizing these, performance of the memory system 10 and a maximum recovery time with respect to a list size are in a trade-off relationship. Namely, as a list size becomes larger, the performance of the memory system 10 may improve, however, a recovery time may increase. In this situation, as will be described below, the list generation unit 111 may determine, based on the workload of the memory system 10, which effect between performance improvement of the memory system 10 or a short recovery time is to be emphasized, and determine a list scale therefrom.

Figures 7, 8, 9:
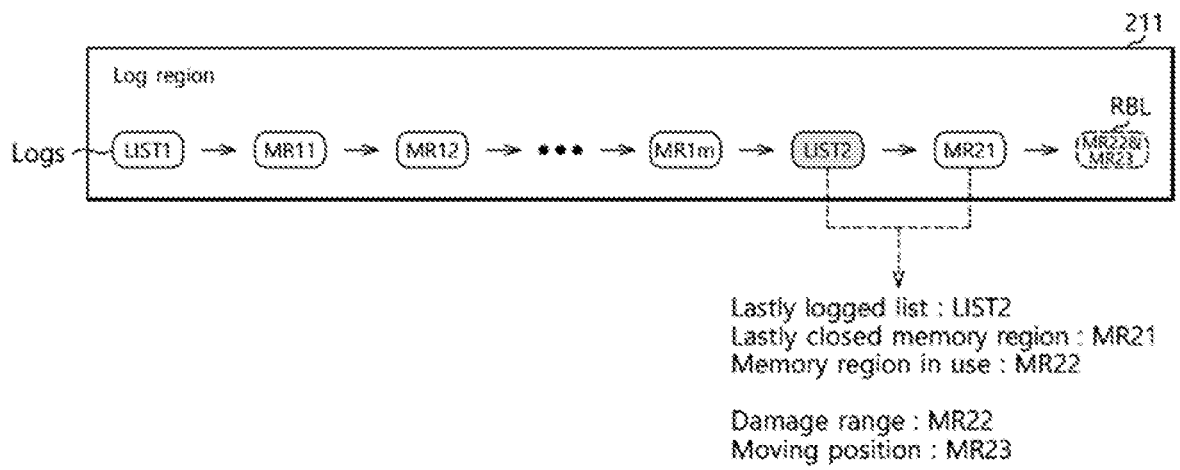
FIG. 7 is a diagram illustrating a method for determining a list size based on the workload of the memory system.
FIG. 8 is a diagram illustrating a method for determining a list size based on the workload of the memory system.
FIG. 9 is a diagram illustrating a recovery operation of the recovery unit for a memory region damage range.

FIG. 7 is a diagram illustrating a method for determining a list size based on the workload of the memory system 10.

Referring to FIG. 7, the list generation unit 111 may determine based on a result of analyzing the workload of the memory system 10 whether a sequential write operation or a random write operation is to be frequent. The list generation unit 111 may determine a list size as "Ns" when a sequential write operation is more frequent than a random write operation, and as "Nr" when a random write operation is more frequent than a sequential write operation. "Ns" may be equal to or larger than 1 and may be equal to or smaller than "Nr." "Nr" may be equal to or larger than "Ns" and may be equal to or smaller than "Nsp." "Nsp" may be a maximum list size that can be processed during a predetermined booting time.

The reason for determining a list size in this way is as follows. First, generally, data written through a sequential write operation (e.g., data fragment of a large-volume video file) is relatively hardly changed, hence, map data for such data of the sequential write operation may not be frequently updated even with a memory region list of a small list size, which means avoidance of the degradation of the performance of the memory system 10 even with a memory region list of a small list size. Meanwhile, when the list size of the memory region list is small for the data of the sequential write operation a map data recovery time will be short when an abnormal power-off occurs. Therefore, when it is determined that a sequential write operation is more frequent than a random write operation, the list generation unit 111 may focus on a short map data recovery time by determining a list size as "Ns".

However, data written through a random write operation may be changed relatively frequently. Since the changed data should be written into new location in the memory system 10, change of data may cause update of corresponding map data. Therefore, when a random write operation is determined to be more frequent than a sequential write operation a memory region list of a large list size is preferable to the data of the random write operation in order to avoid frequent update of map data, which means avoidance of the degradation of the performance of the memory system 10 with a memory region list of a large list size. Therefore, when it is determined that a random write operation is more frequent than a sequential write operation, the list generation unit 111 may focus on improving the performance of the memory system 10 at the cost of the short map data recovery time by determining a list size as "Nr" equal to or larger than "Ns".

Meanwhile, according to an embodiment, if it is determined that the frequency of a sequential write operation is the same as that of a random write operation, the list generation unit 111 may determine a certain value between "Ns" and "Nr" as a list size.

As exemplified in FIG. 7, the list generation unit 111 ray determine a list size by allocating a single value to each of a sequential write operation and a random write operation. Unlike this, as will be described below, the list generation unit 111 may determine a list size by allocating multiple values to each of a sequential write operation and a random write operation.

FIG. 8 is a diagram illustrating another method for determining a list size based on the workload of the memory system 10.

Referring to FIG. 8, the list generation unit 111 may determine based on a result of analyzing the workload of the memory system 10 whether a sequential write operation or a random write operation is to be more frequent as well as whether each of the sequential write operation and the random write operation is strongly frequent or weakly frequent. As described above, the list generation unit 111 may determine a smaller list size as the frequency of a sequential write operation becomes larger, and determine a larger list size as the frequency of a random write operation becomes larger. In other words, the list generation unit 111 may determine a list size as "Ns1" equal to or larger than "1" when the frequency of a sequential write operation is strong and as "Ns2" equal to or larger than "Ns1" when the frequency of a sequential write operation is weak. Further, the list generation unit 111 may determine a list size as "Nr1" equal to or larger than "Ns2" when the frequency of a random write operation is weak and as "Nr2" equal to or larger than "Nr1" and equal to or smaller than "Nsp" when the frequency of a random write operation is strong. As described above, "Nsp" may be a maximum list size that can be processed during a predetermined booting time.

According to an embodiment, three or more values may be allocated to each of a sequential write operation and a random write operation.

Analysis of a workload may be performed based on various analysis techniques that are known or are to be known in the art. Since the analysis does not construct an essential feature of the present embodiment, detailed descriptions thereof will be omitted herein.

FIG. 9 is a diagram illustrating a recovery operation of the recovery unit 114 for a memory region damage range.

As described above with reference to FIG. 5, the recovery unit 114 may determine a map data loss range during a boot operation immediately after an abnormal power-off, and perform a recovery work for the map data loss range. Moreover, the recovery unit 114 may perform a data moving work for a memory region damage range during the boot operation. The memory region damage range may be a memory region which is being used at the time of an abnormal power-off. A process for determining a memory region damage range may be substantially similar to the process of determining the map data loss range described above, and may be performed simultaneously. In other words, the recovery unit 114 may detect a lastly logged memory region list and a lastly logged (i.e., a lastly closed) memory region in the log region 211, and determine as a memory region damage range a map region immediately subsequent to the lastly closed memory region in the lastly logged memory region list.

In detail, referring to FIG. 9, the recovery unit 14 may determine the memory region MR22 as a memory region damage range based on the logs stored in the log region 211. Namely, when the second memory region list LIST2 and the memory region MR21 which are lagged lastly in the log region 211, the recovery unit 114 may determine that the memory region MR21 is closed before the abnormal power-off and the memory region MR22 is being used at the time of the abnormal power-off.

Then, the recovery unit 114 may store in the log region 211 a log RBL on the memory region damage range MR22 and a moving position MR23 (i.e., a new memory region for the memory region damage range MR22). After storing the log RBL, the recovery unit 114 may move the data stored in the memory range damage range MR22 to the new memory region MR23. That is to say, the moving position MR23 may be a memory region immediately subsequent to the memory region damage range MR22 according to a sequence arranged in the second memory region list LIST2.

The log RBL may be stored in preparation for a case where an abnormal power-off is repeated while a data moving work is performed with the new memory region MR23 for the damage range MR22. If the log RBL is found in the log region 211 during the booting after an abnormal power-off, which means that the abnormal power-off is repeated while a data moving work is performed with the new memory region MR23 for the damage range MR22, the recovery unit 114 may discard the current value of the log RBL. The recovery unit 114 may store in the log region 211 the log RBL on the memory region damage range MR22 and a new moving position MR24, and then, perform the data moving work with the new moving position MR24 for the memory region damage range MR22.

Figure 10:
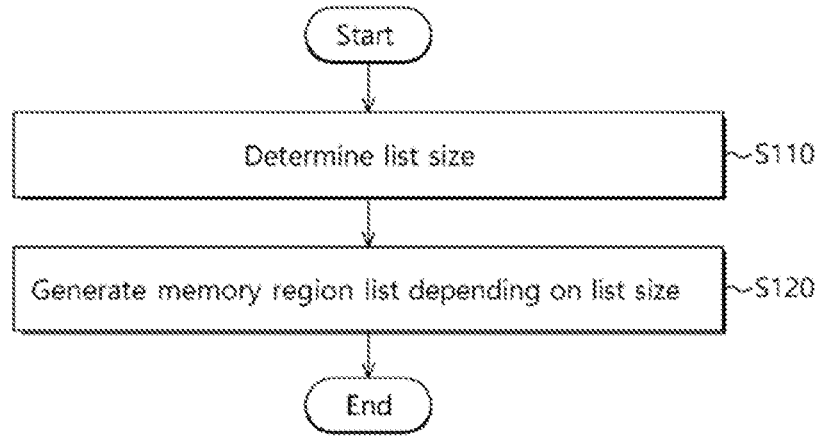
FIG. 10 is a flow chart illustrating a method for operating a list generation unit of FIG. 1.

FIG. 10 is a flow chart illustrating a method for operating the list generation unit 111.

At step S110, the list generation unit 111 may determine a list size depending on the frequencies of a sequential write operation and a random write operation as described above with reference to FIGS. 6A to 8. In detail, the list size may be determined as a first size (e.g., "Ns") when it is determined that a sequential write operation is more frequent than a random write operation, and may be determined as a second size (e.g., "Nr") equal to or larger than the first size when it is determined that a random write operation is more frequent than a sequential write operation. According to an embodiment, the list size may be determined to become smaller as the frequency of a sequential write operation becomes larger, and may be determined to become larger as the frequency of a random write operation becomes larger, as described above with reference to FIG. 8.

At step S120, the list generation unit 111 may generate a memory region list including one or more memory regions, which are to be sequentially used for a purpose of data storage, depending on the list size. The list generation unit 111 may generate a succeeding memory region list in advance before all of memory regions included in a previous memory region list are accessed. Alternatively, the list generation unit 111 may generate a succeeding memory region list after all of memory regions included n a previous memory region list are accessed.

Figure 11:
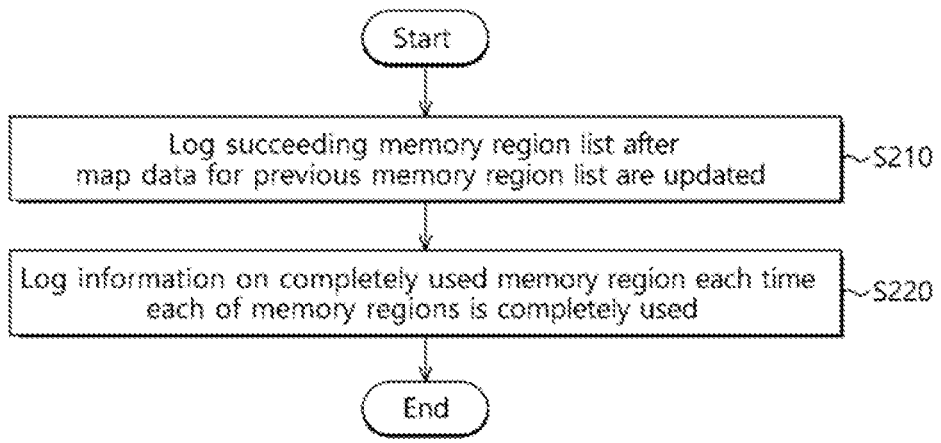
FIG. 11 is a flow chart illustrating a method for operating a log unit shown in FIG. 1.

FIG. 11 is a flow chart illustrating a method for operating the log unit 112.

At step S210 after map data for a previous memory region list are updated, the log unit 112 may log a succeeding memory region list in the log region 211 before accessing memory regions included in the succeeding memory region list.

At step S220, each time each of the memory regions is completely accessed, i.e. is closed, the log unit 112 may log an information on the completely accessed memory region in the log region 211.

Figure 12:
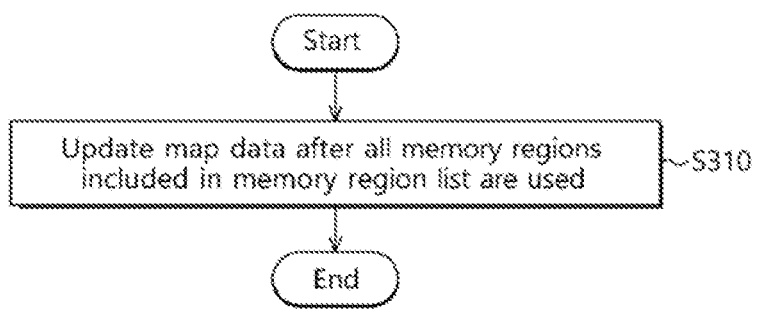
FIG. 12 is a flow chart illustrating a method for operating a map management unit shown in FIG. 1.

FIG. 12 is a flow chart illustrating a method for operating the map management unit 113.

At step S310, after all of memory regions included in a memory region list are accessed, the map management unit 113 may update map data for the memory regions. In detail, the map management unit 113 may update out-of-date map data stored in the map data region 212 based on up-to-date snap data stored in the working memory 120.

Figure 13:
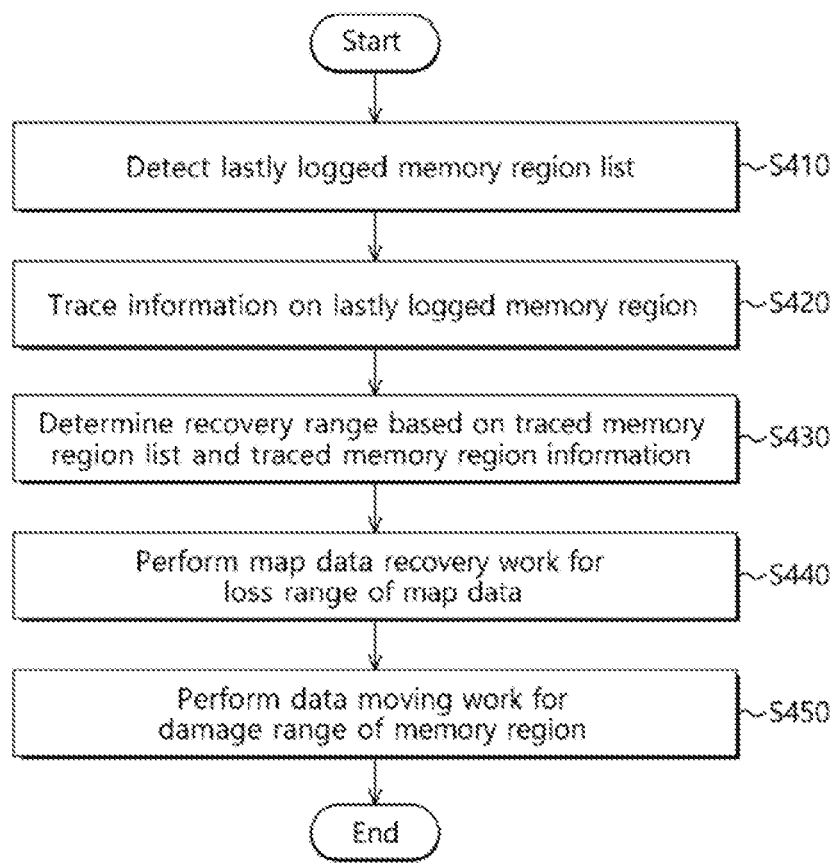
FIG. 13 is a flow chart illustrating a recovery operation method of a recovery unit shown in FIG. 1 for an abnormal power-off.

FIG. 13 is a flow char illustrating a recovery operation method of the recovery unit 114.

At step S410, the recovery unit 114 may detect a lastly logged memory region list from log data in the log region 211.

At step S420, the recovery unit 114 may detect a lastly logged (i.e., a lastly dosed) memory region from log data in the log region 211.

At step S430, the recovery unit 114 may determine a recovery range based on the memory region list and the information on the memory region which are detected. In detail, the recovery unit 114 may determine as a map data loss range a first one to an immediately subsequent one of the lastly closed memory region among the memory regions in the lastly logged memory region list. Further, the recovery unit 114 may determine as a memory region damage range a memory region immediately subsequent to the lastly closed memory region in the lastly logged memory region list.

At step S440, the recovery unit 114 may perform a map data recovery work for the map data loss range. The recovery unit 114 may recover lost map data in the working memory 120 by collecting the map data stored in memory regions as the map data loss range.

At step S450 the recovery unit 114 may perform a data moving work for the memory region damage range. The recovery unit 114 may determine as a moving position a memory region immediately subsequent to the memory region damage range in the lastly logged memory region list, and move data stored in the memory region damage range to the moving position.

While it is illustrated in FIG. 13 that the data moving work is performed at the step S450 after the map data recovery work is performed, it is to be noted that the present embodiment is not limited to such a sequence.

Figure 14:
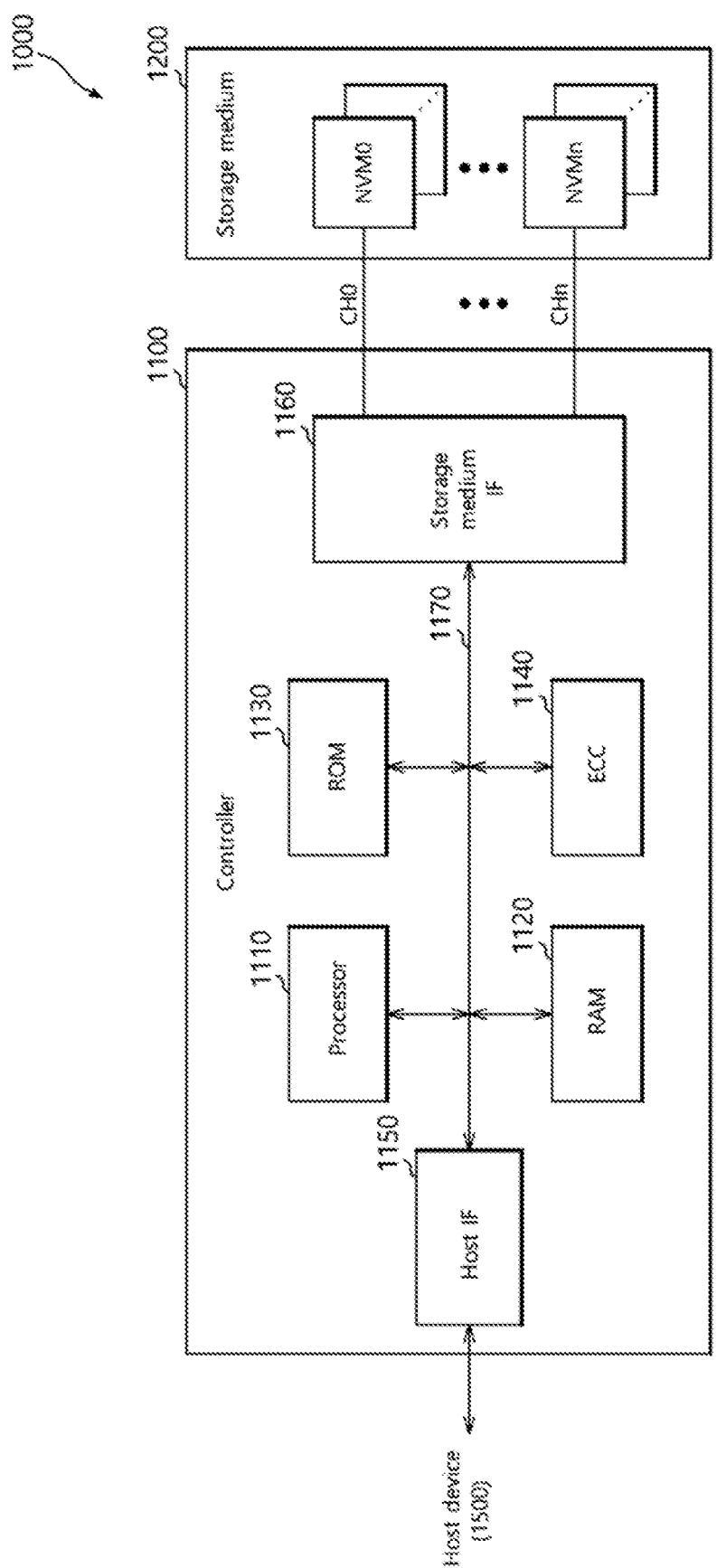
FIG. 14 is a block diagram illustrating a solid-state drive (SSD) in accordance with an embodiment.

FIG. 14 is a block diagram illustrating a solid-state drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150 and a storage medium interface 1160 which are coupled through an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The processor 1110 may be configured and operate substantially similarly to the processor 110 of FIG. 1, with respect to the memory regions included in the storage medium 1200. That is to say, the processor 1110 may update, after accessing all of one or more first memory regions included in a first memory region list for a purpose of data storage, map data for the first memory regions, determine a list size based on the workload of the SSD 1000, generate a second memory region list including one or more second memory regions depending on the list size, and use, after the update of the map data for the first memory regions, the second memory regions for a purpose of data storage.

According to an embodiment, the processor 1110 may determine a list size based on the workload of the SSD 1000, generate a memory region list including one or more memory regions depending on the list size, log the memory region list before accessing the memory regions included in the memory region list for a purpose of data storage, and update map data for the memory regions after accessing all of the memory regions for a purpose of data storage.

According to an embodiment, the processor 1110 may log a first memory region list before accessing one or more first memory regions included in the first memory region list for a purpose of data storage, update map data for the first memory regions after accessing all of the first memory regions for a purpose of data storage, and log a second memory region list before accessing one or more second memory regions included in the second memory region list for a purpose of data storage, wherein the logging of the second memory region list may succeed the update of the map data for the first memory regions.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The RAM 1120 may correspond to the working memory 120 of FIG. 1. That is to say, the RAM 1120 may retain new map data 121.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data according to an ECC algorithm.

The host interface 1150 may exchange data processing requests, data etc. with the host device 1500.

The storage medium interface 1160 may transmit control signals and data to the storage medium 1200. The storage medium: interface 1160 may be transmitted with data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform a write operation and a read operation according to control of the controller 1100.

The storage medium 1200 may be configured and operate in substantially the same way as the storage medium 200 shown in FIGS. 1.

Figure 15:
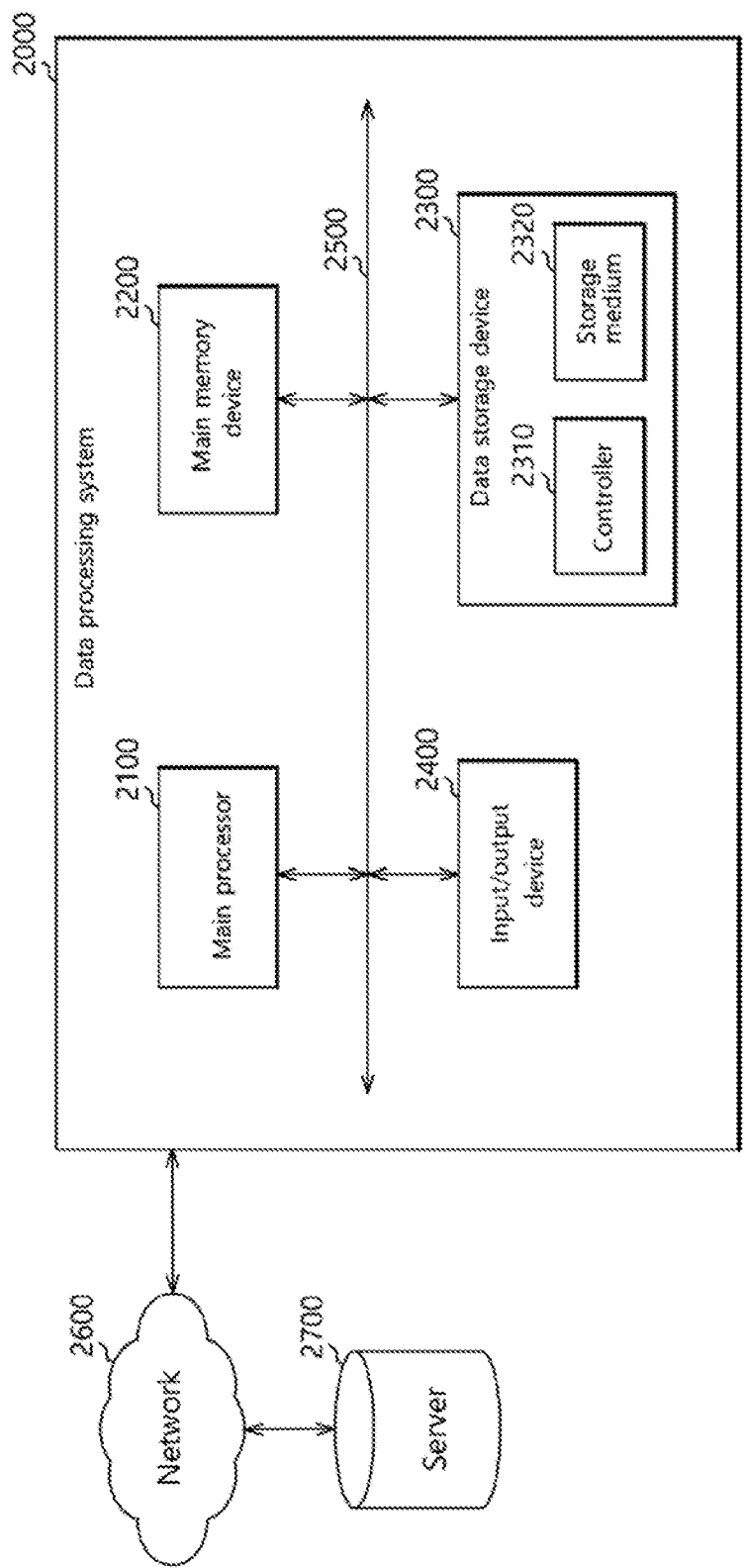
FIG. 15 is a block diagram illustrating an exemplary data processing system to which the memory system in accordance with the embodiment is applied.

FIG. 15 is a block diagram illustrating a data processing system 2000 to which the memory system 10 in accordance with the embodiment is applied.

The data processing system 2000 may include a computer, a laptop, a netbook, a smart phone, a digital TV, a digital camera, a navigator, etc. The data processing system 2000 may include a main processor 2100, a main memory device 2200 a memory system 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit such as a microprocessor. The main processor 2100 may execute softwares such as an operation system, an application, a device driver, and so forth, on the main memory device 2200.

The main memory device 2200 may store programs and program data to be used by the main processor 2100. The main memory device 2200 may temporarily store data to be transmitted to the memory system 2300 and the input/output device 2400.

The memory system 2300 may include a controller 2310 and a storage medium 2320. The memory system 2300 may be configured and operate substantially similarly to the memory system 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network) a WAN (wide area network), a wireless network, and so on The data processing system 2000 may include a network interface (not shown) to access the network 2600.

While various embodiments have been described above, will be understood to those skilled in the art that the embodiments described are examples only. Accordingly, the memory system and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A method for operating a memory system including a storage medium and a controller, the storage medium including a map data region, a log region, and a plurality of memory regions, the controller including a working memory, the method comprising:
   each time data is stored in a first memory region among one or more first memory regions included in a first list, storing, by the controller, mapping information between a logical address of the data and the first memory region, in the working memory as new map data of the first memory region;
   updating, by the controller, after accessing all of the first memory regions for a purpose of data storage, map data for the first memory regions, by invalidating old map data stored in the map data region and storing in the map data region new map data of the first memory regions stored in the working memory;
   determining, by the controller, a list size based on a workload of the memory system, and generating a second list including one or more second memory regions depending on the list size; and
   accessing, by the controller, after the updating of the map data, the second memory regions for a purpose of data storage.

2. The method according to claim 1, wherein the list size is determined to have a first value when it is determined that a sequential write operation is more frequent than a random write operation, and is determined to have a second value equal to or larger than the first value when it is determined that a random write operation is more frequent than a sequential write operation.

3. The method according to claim 1, wherein the list size is determined to have smaller value as a frequency of a sequential write operation becomes larger, and is determined to have larger value as a frequency of a random write operation becomes larger.

4. The method according to claim 1, further comprising, before the accessing of the second memory regions, logging, by the controller, after the updating of the map data, the second list in the log region.

5. The method according to claim 4, further comprising each time usage of a second memory region among the second memory regions is completely finished, logging, by the controller, in the log region an information on the second memory region.

6. The method according to claim 5, further comprising:
   detecting, by the controller, a lastly logged list from log data in the log region;
   detecting, by the controller, a lastly logged memory region from the log data in the log region;
   determining, by the controller, a map data loss range based on the detected list and the detected memory region; and
   performing, by the controller, a map data recovery work for the loss range.

7. The method according to claim 5, further comprising:
   detecting, by the controller, a lastly logged list from log data in the log region;
   detecting, by the controller, a lastly logged memory region from the log data in the log region;
   determining, by the controller, a memory region damage range based on the detected list and the detected memory region; and
   performing, by the controller, a data moving work for the damage range.

8. The method according to claim 7, further comprising, before the performing of the data moving work:
   determining, by the controller, a moving position to which data stored in the memory region damage range are to be moved based on the detected list; and
   logging, by the controller, an information on the memory region damage range and the moving position in the log region.

9. A method for operating a memory system including a storage medium and a controller, the storage medium including a map data region, a log region, and a plurality of memory regions, the controller including a working memory, the method comprising:
   determining, by the controller, a list size based on a workload of the memory system, and generating a list including one or more memory regions among the plurality of memory regions depending on the list size;
   logging, by the controller, the list in the log region before accessing the one or more memory regions for a purpose of data storage;
   each time data is stored in a memory region among the one or more memory regions, storing, by the controller, mapping information between a logical address of the data and the memory region, in the working memory as new map data of the memory region, and
   updating, by the controller, after accessing all of the one or more memory regions for a purpose of data storage, map data for the one or more memory regions, by invalidating old map data stored in the map data region and storing in the map data region new map data of the one or more memory regions stored in the working memory.

10. The method according to claim 9, wherein the logging of the list in the log region is performed after map data for all memory regions included in a previous list are updated.

11. The method according to claim 9, wherein the list size is determined depending on frequencies of a sequential write operation and a random write operation.

12. The method according to claim 9, further comprising each time usage of the memory region among the one or more memory regions is completely finished, logging, by the controller, in the log region an information on the memory region.

13. The method according to claim 12, further comprising:
   detecting, by the controller, a lastly logged list from log data in the log region;
   detecting, by the controller, a lastly logged memory region from log data in the log region;
   determining, by the controller, a map data loss range based on the detected list and the detected memory region; and
   performing, by the controller, a map data recovery work for the loss range.

14. The method according to claim 12, further comprising:
   detecting, by the controller, a lastly logged list from log data in the log region;
   detecting, by the controller, a lastly logged memory region from the log data in the log region;
   determining, by the controller, a memory region damage range based on the detected list and the detected memory region; and
   performing, by the controller, a data moving work for the damage range.

15. The method according to claim 14, further comprising, before the performing of the data moving work:
   determining, by the controller, a moving position to which data stored in the memory region damage range are to be moved based on the detected list; and
   logging, by the controller, an information on the memory region damage range and the moving position in the log region.

16. A method for operating a memory system including a storage medium and a controller, the storage medium including a map data region, a log region, and a plurality of memory regions, the controller including a working memory, the method comprising:
   logging, by the controller, before accessing one or more first memory regions included in a first list for a purpose of data storage, the first list in the log region;
   each time data is stored in a first memory region among one or more first memory regions included in a first list, storing, by the controller, mapping information between a logical address of the data and the first memory region, in the working memory as new map data of the first memory region;
   updating, by the controller, after accessing all of the first memory regions for a purpose of data storage, map data for the first memory regions, by invalidating old map data stored in the map data region and storing in the map data region new map data of the first memory regions stored in the working memory; and
   logging, by the controller, before accessing one or more second memory regions included in a second list for a purpose of data storage, the second list in the log region,
   wherein the logging of the second list succeeds the updating of the map data.

17. The method according to claim 16, further comprising determining, by the controller, a list size based on a workload of the memory system, and generating the second list depending on the list size.

18. The method according to claim 16, wherein the list size is determined depending on frequencies of a sequential write operation and a random write operation.

19. The method according to claim 16, further comprising performing, by the controller, a recovery operation for a recovery range determined based on the log region, when an abnormal power-off occurs.

* * * * *